United States Patent [19]

Piccolo et al.

[11] Patent Number: 5,154,046
[45] Date of Patent: Oct. 13, 1992

[54] METHOD FOR THE COUPLING OF ARTICULATING TRACK LINKS WITH A DETERMINED TOLERANCE BY MEANS OF PRESS FITTING

[75] Inventors: Antonio Piccolo, Modena; Domenico Vaccaro, Potenza, both of Italy

[73] Assignee: Italtractor I.T.M. S.p.A., Potenza, Italy

[21] Appl. No.: 720,993

[22] Filed: Jun. 26, 1991

[30] Foreign Application Priority Data

Jul. 13, 1990 [IT] Italy .............................. 40103 A/90

[51] Int. Cl.⁵ ................................................. B21L 9/06
[52] U.S. Cl. ............................................ 59/7; 59/35.1; 29/718
[58] Field of Search ................. 59/7, 11, 35.1; 29/718

[56] References Cited

U.S. PATENT DOCUMENTS

| | | | |
|---|---|---|---|
| 3,412,451 | 11/1968 | Vieser et al. | 29/718 |
| 4,339,961 | 7/1982 | Grillot et al. | 59/7 |
| 4,531,355 | 7/1985 | Numakura | 59/11 |
| 4,621,491 | 11/1986 | Moriki et al. | 59/7 |

*Primary Examiner*—David Jones
*Attorney, Agent, or Firm*—Browdy and Neimark

[57] ABSTRACT

The invention relates to a method for the coupling of articulated track links with a determined tolerance by means of press fitting. In particular, said method is applied in the assembly of articulated link track chains for tracker vehicles where joint links (5) are pressed on to the two ends of a central pivot (2), on which at least one second element, or bushing (3) is rotably coupled, which bushing (3) is axially held by the two said joint links (5). According to the invention, all the elements, including spacers (4), are compressed into a "pack" configuration by the action of a maximum compression force, determined individually for each case with regard to the geometric characteristics of the various elements and the properties of the materials of which they are constituted, on the basis of the determination, effected during the course of the realisation of the press-fitting, of the total force necessary to overcome the opposition offered to relative axial sliding before reaching the "pack" configuration.

6 Claims, 3 Drawing Sheets

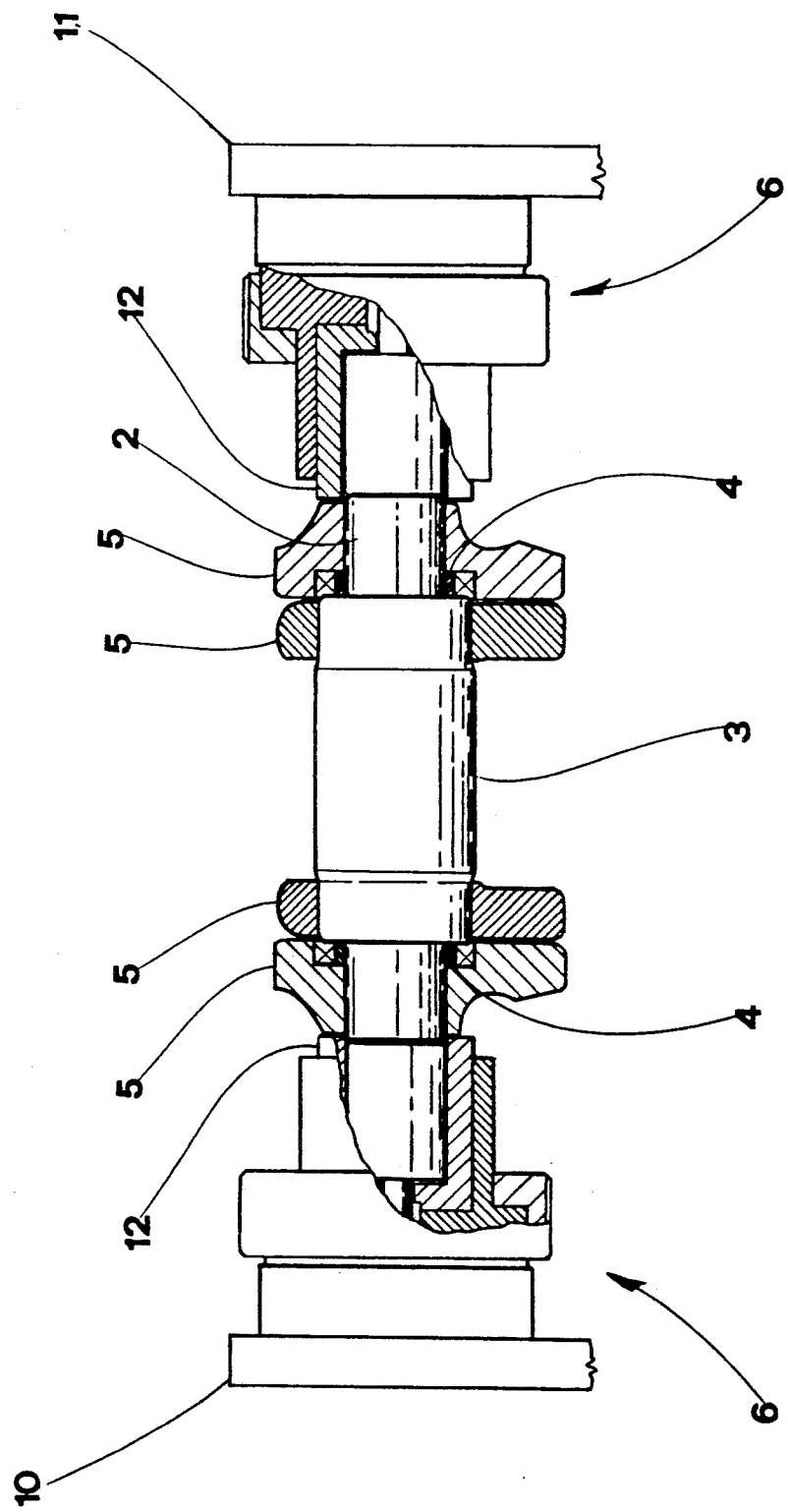

METHOD FOR THE COUPLING OF ARTICULATING TRACK LINKS WITH A DETERMINED TOLERANCE BY MEANS OF PRESS FITTING

BACKGROUND OF THE INVENTION

The invention relates to a method for the coupling of articulated track links with a determined tolerance by means of press fitting.

The invention also relates to an apparatus specifically aimed at performing the above-named method.

In particular, but not exclusively, said method is applied in the coupling of articulated link track chains for tracker vehicles. Such track chains normally comprise a plurality of links having reciprocally articulated elements. The articulation between the various elements is realised with parallel pivots so that relative movements between the single elements are limited to rotations around said pivots. These pivots are reciprocally connected by means of two series of joint links, each of which joint links connects two pivots located consecutively along the track and is equipped to be fitted, at one of its ends, directly and immovably on one of the two pivots, and at its other end, also directly and immovably, on a bushing rotatably coupled on the other pivot. Thus each articulation comprises one pivot, on which a bushing is coaxially and rotatably coupled, which bushing is in its turn axially held, with respect to the pivot, by two joint links stably fixed on the two opposing ends of the same pivot. The two ends of the joint links comprising the successive ring of the articulated chain are coupled on the bushing. The coupling of the two joint links to the two ends of the pivot is normally a press fitting obtained by means of a press. To guarantee the correct functioning of the articulation it is necessary, at the end of the operation, to obtain a determined tolerance between the bushing, rotatably coupled on the pivot, or more frequently between the unit comprising said bushing and spacers, also coupled on the pivot, and the two joint links which are fixed to the ends of the pivot.

The situation becomes particularly important when it is necessary to respect a very limited tolerance. This, for example, is the case in articulations of lubricated tracks in which a frontal seal between the bushing and the joint links fixed to the ends of the pivot is envisaged.

In fact, in the prior art, this axial tolerance is uncontrollable. It is determined as a consequence of the pressing operation of the two joint links which are pressed on to the two ends of the pivot by means of a pressing action sufficient either to bring the two joint links to a determinned reciprocal distance under pressure or to bring them into contact with the "pack" of elements which are rotatably coupled on the pivot, exercising a determined pressing force which is very elevated since it is calculated on the basis of the maximum admitted interference. In the first case the tolerance is inevitably variable within a too-wide range (with values up to 1÷2 mm); in the second case there is frequently the danger of causing the total blockage of the articulation or indeed the breaking of some of the elements of which it is composed, in particular the spacers.

Another way of operating which does not permit of realising the coupling in such a way as to respect a determined tolerance is that of realising the pressing operation using a determined pressure which is made to act upon the various articulations for a predetermined length of time.

The present invention, as characterised in the claims which follow, offers a simple and effective solution to the above-described problem, that of realising a determined tolerance for the articulation element coupling by means of pressfitting.

Further aim of the present invention is to provide a method for the coupling of the articulation elements which method's execution and efficiency are not minimally influenced by the variability of the number of elements to be coupled within the respective tolerance ranges.

An advantage of the invention is that it permits of reaching an elevated standard of quality and constancy of quality in the realisation of the track articulation mounting operation.

Further advantage lies in the intrinsic ability of the method to provide, in real time from the moment of the mounting operation, important information regarding any possible defect in the coupling and in the parts comprised in the coupling.

BRIEF DESCRIPTION OF THE ILLUSTRATIONS

Further characteristics and advantages of the invention will better emerge in the detailed description which follows, of a preferred but not exclusive embodiment of the invention, illustrated here purely in the form of a non-limiting example in the accompanying diagrams, in which:

FIG. 3 shows, in enlarged scale, a section along line I—I of FIG. 1, relative to a further operating configuration.

DETAILED DESCRIPTION OF THE PREFERRED EMBODIMENT

Figure 1:
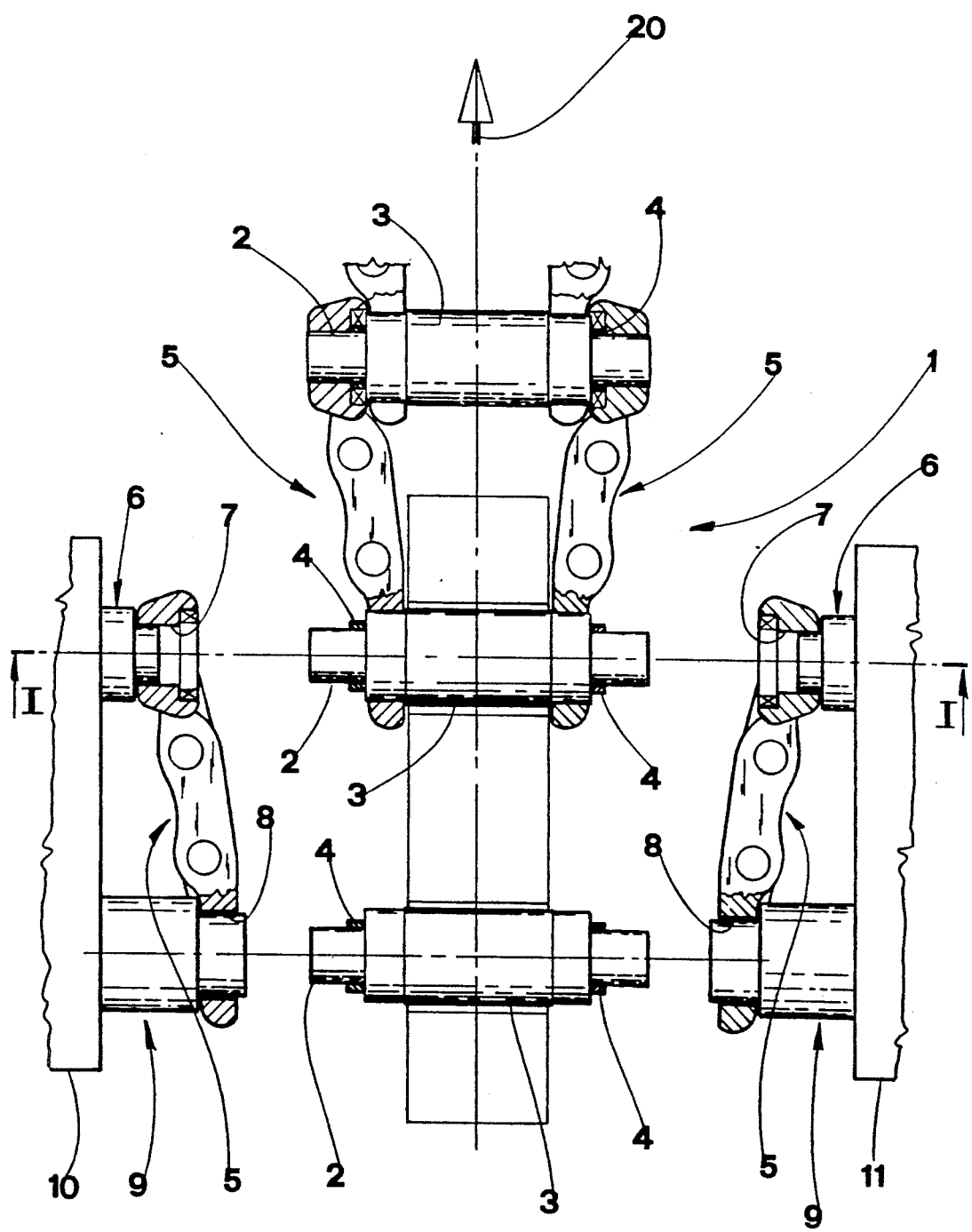
FIG. 1 shows a schematic view of an assembly line for track chains, arranged to operate in accordance with the invention.
Figure 2:
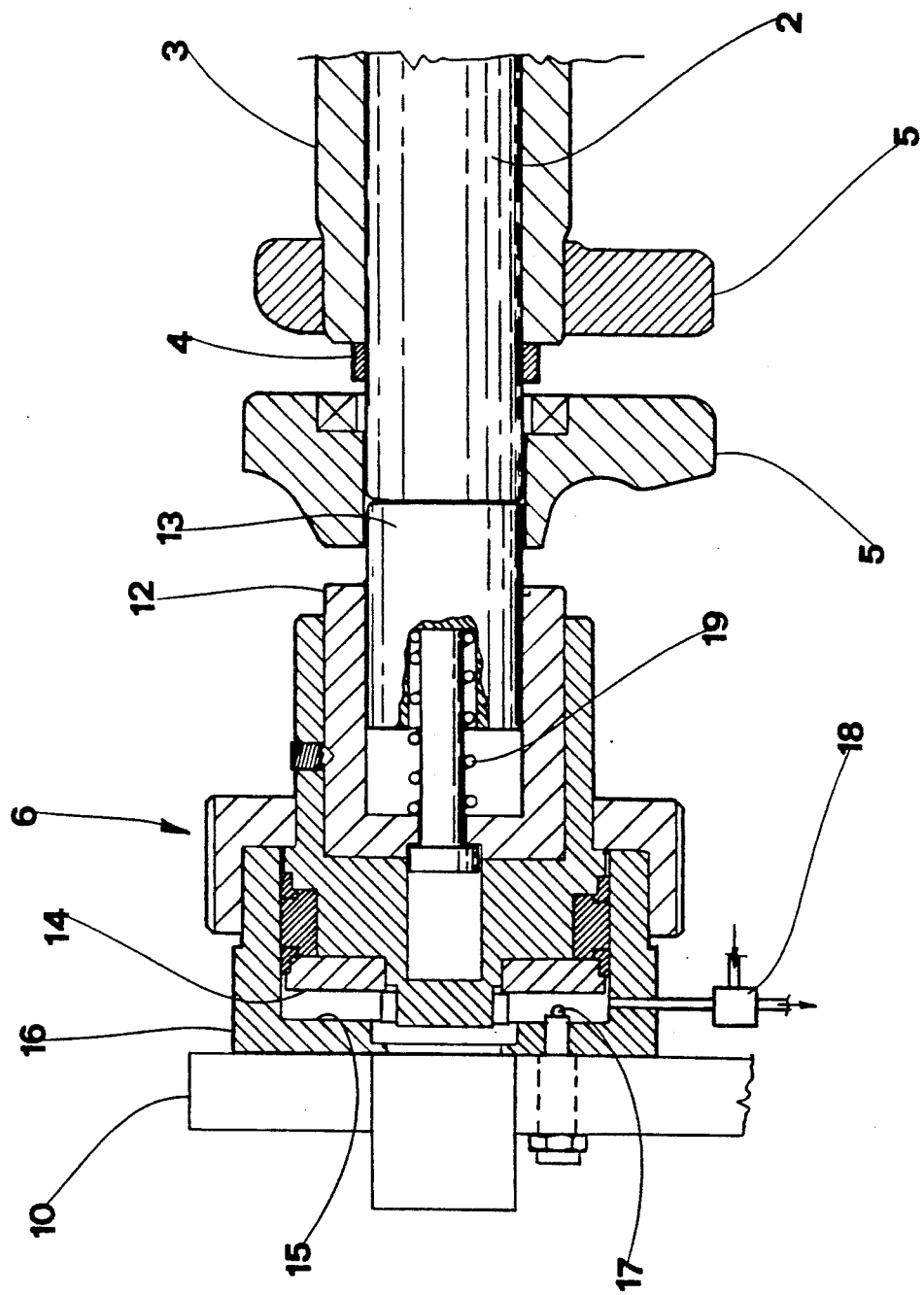
FIG. 2 shows, in enlarged scale, a section according to line I—I of FIG. 1, in a different operating configuration.

With reference to the diagrams, 1 indicates an articulated track chain during assembly phase. The operation is performed at the press, where the various elements comprising the articulation are coupled. Each articulation comprises a first element or central pivot 2 on which a second central element or bushing 3 and two spacers 4 are rotatably coupled with a determined tolerance; said spacers 4 are placed at the sides of the bushing 3 and are axially held in position by two joint links 5 which are fixed to the two ends of the central pivot 2 by means of press fitting. The fitting of the fitting holes 7 of the joint links 5 on the opposing ends of the central pivot 2 is realised by means of the coaligned and opposite pressing heads 6; contemporaneous with this operation is the fitting of the fitting holes 8 of the same joint links 5 on the ends of the bushing 3 by means of the pressing heads 9, also coaligned and opposite; said bushing 3 being already arranged on the central pivot 2 of the contiguous articulation. A pair of reciprocally solid pressing heads 6 and 9 acts on each of the joint links 5. In particular, with reference to the advancement direction of the track, indicated by the arrow 20, the pressing head pair comprising 6 and 9, located on the left side, is solidly mounted to a support 10, while the pressing head pair located on the right side is fixed on another support 11.

The pressing of the fitting holes 7 of the joint links 5 on the ends of the central pivot 2 is performed by the pressing heads 6 through the activation of a method which envisages:

instant reading, effected during the coupling operation, of the total force necessary to overcome the total opposition offered to the relative axial sliding of the fitting holes 7 on the ends of the central pivot 2 before reaching the "pack" configuration which is represented by the reciprocal contact of all the elements constituting the articulation, that is the two joint links 5, the spacers 4 and the bushing 3.

the determination of a reference value for such force, indicated by Fa (meaning average, that is, cutting the peaks), manifested constantly along a short tract previous to the reaching of the abovedefined "pack" configuration;

the determination of a superior limit value, indicated by Fmax, of the total force with which all the elements of the articulation are compressed into the "pack" configuration on the basis of the following relation:

$$Fmax = Fa + C_1 \times Fa - C_2 \times T$$

in which $C_1$ is a coefficient depending on the nature of the materials and the geometric characteristics of the constituent elements (central pivot 2-bushing 3-spacers 4);

$C_2$ is a parameter which depends on the nature of the materials and on the geometric characteristics of the elements of articulation which are not forced on the central pivot 2, that is, the bushing 3 and the spacers 4;

T represents the value of the determined tolerance for the coupling;

the reading, effected during the course of the application of pressure for the pressing operation, of the total action Ft with which the said elements are compressed into the "pack" configuration;

the comparison of the value Ft with the Fmax superior limit value;

the cancelling of the total Ft bearing on the totality of the elements compressed in the "pack" configuration as soon as the value reaches the Fmax value.

Determination of the $C_1$ and $C_2$ parameters is made once for all for every type of articulation using the following relations:

$$C_1 = C_2/K_{(2)};$$

$$C_2 = K_{(3)} \cdot K_{(4)}/K_{(3)} + K_{(4)}$$

in which:

$K_{(2)}$ = axial compression rigidity of the central pivot 2, $K_{(3)}$ = axial compression rigidity of the bushing 3, $K_{(4)}$ = axial compression rigidity of the spacers 4.

The Fmax value to which the "pack" configuration of central pivot 2, bushing 3 and spacers 4 is subjected with the aim of obtaining the determined tolerance average T is obtained by taking value Fa, determined, as above-described, previous to the reaching of the "pack" configuration, and summing to it an increase of pressure Fs defined by the relation $Fs = C_1 \times Fa - C_2 \times T$. This increase in pressure Fs is calculated, on the basis of Fa, under the condition that tolerance T is determined as the difference between the variation in length experienced by the central pivot 2 under the action of force Fa and the corresponding variation in the length of the "pack", formed by the bushing 3 and the spacers 4, which experience the increase in pressure Fs. The whole operative cycle is activated through the pressing heads 6 fixed to the supports 10 and 11, through which the press transmits the total force Ft. Each pressing head 6 is provided with a pushring 12 inside which a perfectly-fitting centering pivot 13 is axially slidably coupled, which centering pivot 13 is specifically arranged to couple on the central pivot 2. In at least one of the two pressing heads 6 the pushring 12 is solidly mounted to a hydraulic ram 14, which is sealedly coupled to and axially slidable to the inside of a cylindrical chamber 15 bored coaxially in the body 16 of the pressing head 6, which is in its turn fixed on the support 11 (or 10). The total travel of the ram (or rams) 14 is calculated in such a way that it is certainly greater than the sum of the tolerance ranges of the dimensions (evaluated axially) of the various elements of the "pack". The cylindrical chamber 15 contains oil and is closed by a three-way valve 18 which is commanded by a control unit which directs the entire apparatus. A pressure transducer, schematically indicated by 17, is arranged in the cylindrical chamber 15 with the aim of continually monitoring the oil pressure inside said cylindrical chamber 15. This pressure value is taken, apart from the multiplicative factor constituted by the ram 14 area, as the measure of the entity of the action (the press) totally exercised on the "pack" of the central pivot 2, the bushing 3 and the spacers 4 during the course of the whole coupling operation. The pressure signal thus obtained is elaborated, eliminating the peaks, and is thus used for the determination of reference value Fa as well as for the measurement of the total push in action, moment for moment, during the execution of the coupling. Reference value Fa, determined in real time previous to reaching the "pack" configuration, is sent to a processor which uses it to calculate the value of Fs and thus of Fmax on the basis of parameters $C_1$, $C_2$ and T, already inserted into the processor.

The control unit performs, moment for moment, the comparison between the total Ft value acting during the execution of the coupling and the limit value Fmax, calculated on the basis of Fa, and commands the opening of the three-way valve 18 when the Ft press equals Fmax.

The opening of the three-way valve 18, which unloads the oil contained in the cylindrical chamber 15, cancels the total push bearing on the "pack" in good time, independently of the continuance of the press action on the supports 10 and 11. The press continues the programmed cycle and finishes back in the starting position.

The whole operation is facilitated by the presence of the centering pivots 13, which are axially constrained and axially slidable inside the pushrings 12 and which from the minimum excursion position, corresponding to the final pressing phase, are automatically pushed into the position of maximum excursion by the springs 19.

The system permits of automatically "determining" the pressing action on each single articulation, thereby always obtaining the same result in terms of axial tolerance in a way which is totally independent of the variations in the sizes of the various said elements. Furthermore, the device, thanks to the special configuration of the pressing head 6, wherein the force is transmitted and measured through the oil contained in the cylindrical chamber 15, always performs the correct mounting of the joint links 5, both as regards the coupling between the fitting holes 7 and the ends of the central pivot 2, and as regards the coupling of the fitting holes 8 on the ends of the bushing 3, setting aside the tolerances of the sizes axially presented by the elements to be coupled.

An apparatus entirely analogous to the one described above with respect to at least one of the pressing heads 6 could obviously be envisaged for each or for both of the pressing heads 9.

What is claimed is:

1. A method for the coupling of articulated track links with a determined tolerance to form an articulated link track chain (1) of the type having a first central pivot (2) on which at least one second bushing (3) is rotatably and coaxially coupled and held axially by two joint links (5) fixed to the two ends of said first central pivot (2) by means of press fitting, wherein said method comprises:

mounting of at least said bushing (3) on said central pivot (2);

positioning said two joint links (5) on said two ends of said first central pivot (2) for axially press-fitting said two joint links (5) in opposite directions into a pack configuration with said bushing (3);

instantaneously reading the total force, during the course of the coupling operation, necessary to overcome the total opposition offered to the relative axial sliding of said joint links (5) on to said central pivot (2) before finally reaching said pack configuration;

determining a reference value force, Fa, based on the reading of said total force during the course of the coupling operation before reaching said pack configuration;

determining a superior limit value, indicated by Fmax, of the said total force with which said joint links (5) are press-fitted on said central pivot (2) into said pack configuration;

said superior limit value being determined as the sum of said average force Fa and a supplementary force Fs, defined by the relation $$Fs = C_1 \times Fa - C_2 \times T$$

where $C_1$ is a coefficient which depends on the nature of the materials and the geometric characteristics of the elements comprising said articulated track links, $C_2$ is a coefficient which depends on the nature of the materials and the geometric characteristics of said elements comprising said articulated track links which are not forced on said central pivot (2), and T represents the value of said determined tolerance envisaged for the coupling;

reading the effective value of said total force during the course of the coupling operation to compress said joint links (5) on to said central pivot (2) into the pack configuration;

comparing said effective value of said total force with the Fmax superior limit value; and canceling the total force bearing on the totality of the elements compressed in said pack configuration as soon as said effective value reaches the Fmax value.

2. Method as in claim 1, wherein the coefficient $C_1$ is defined as the relationship between the coefficient $C_2$ and the rigidity under axial pressure of said central pivot (2); coefficient $C_2$ being defined as the rapport between the product of the axial compression rigidity of the bushing (3) and a plurality of spacers (4), rotatably coupled on the central pivot (2), and the sum of the axial compression rigidity of said bushing (3) and said plurality of spacers (4).

3. Apparatus for the coupling of articulated track links with a determined tolerance to form an articulated link track chain (1) of the type having a first central pivot (2) on which at least one second bushing (3) is rotatably and coaxially coupled and held axially by two joint links (5) fixed to the two ends of said first central pivot (2) by means of press fitting, said apparatus comprising:

two coaligned and opposed first pressing heads (6) for compressing said two joint links (5) on to said two ends of said first central pivot (2);

each of said first pressing heads (6) having a pushring (12);

a coaxial centering pivot (13) slidably mounted in each said pushring (12);

each of said centering pivots (13) respectively positioned to slide a fitting hole (7) in each of said two joint links (5) onto an end of said central pivot (2);

said pushring (12) of at least one of said two first pressing heads (6) fixed to a hydraulic ram (14);

said hydraulic ram (14) slidably mounted in a cylindrical chamber (15) in a body (16) of said at least one of said first pressing heads (6);

said hydraulic ram (14) actuated by oil pressure within said cylindrical chamber (15);

said oil pressure regulated by a three-way valve (18);

a pressure transducer for measuring the oil pressure within said cylindrical chamber (15) reflecting the pressure exerted by said apparatus during compression of said two joint links (5) into said two ends of said first central pivot (2); and a control unit and processor for comparing real time pressures measured by said transducer against referenced pressures calculated on the basis of said real time pressures by said control unit and processor;

said controller unit and processor further controlling the opening and closing of said three-way valve (18); and said control unit and processor opening said three-way valve when a determined referenced pressure is reached during operation of said apparatus.

4. Apparatus in accordance with claim 3, wherein said centering pivot (13) is axially limited in its possibility of movement with respect to said pushring (12), between two extremes of minimum and maximum excursion; a spring operating between said pushring (12) and said centering pivot (13), said spring constantly pushing said centering pivot (13) into the position of maximum excursion.

5. Apparatus in accordance with claim 3, further comprising two second pressing heads (9), coaligned and opposed to act on said joint links (5) for press-coupling said joint links (5) onto said bushing (3), said bushing (3) providing articulation of said chain (1) arranged contiguously to the articulation on which the press-coupling of said joint links (5) on the ends of said central pivot (2) is performed.

6. Apparatus in accordance with claim 5, wherein each of the said second pressing heads (9) is solidly mounted to a body of the relative and corresponding said first pressing heads (6).

* * * * *